(12) United States Patent
Seely et al.

(10) Patent No.: US 7,081,725 B2
(45) Date of Patent: Jul. 25, 2006

(54) POWER ELECTRONICS APPARATUSES FOR DOUBLE-FED INDUCTION GENERATOR TO INDUCTION MOTOR DRIVE SYSTEM

(75) Inventors: Stanley S. Seely, Canton, MI (US); Zilai Zhao, Canton, MI (US); Carl David Klaes, Livonia, MI (US); Melody Abesamis, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 315 days.

(21) Appl. No.: 10/772,399

(22) Filed: Feb. 6, 2004

(65) Prior Publication Data

US 2005/0173167 A1 Aug. 11, 2005

(51) Int. Cl.
*H02P 9/14* (2006.01)
*H02P 7/06* (2006.01)

(52) U.S. Cl. .................. 318/139; 318/158; 318/376; 318/432; 180/65.4

(58) Field of Classification Search ............... 318/139, 318/140, 151–154, 158, 375, 376, 430–434, 318/606, 609–610; 180/65.1, 65.2, 65.3, 180/65.4
See application file for complete search history.

(56) References Cited

U.S. PATENT DOCUMENTS

| | | | |
|---|---|---|---|
| 3,560,759 A | 2/1971 | Buehler et al. | |
| 3,659,672 A | 5/1972 | Jacobus | |
| 3,970,160 A | 7/1976 | Nowick | |
| 4,211,930 A | 7/1980 | Fengler | |
| 4,335,429 A | 6/1982 | Kawakatsu | |
| 4,444,285 A | 4/1984 | Stewart et al. | |
| 4,562,894 A * | 1/1986 | Yang ..................... | 180/65.2 |
| 4,774,811 A | 10/1988 | Kawamura | |
| 5,172,784 A | 12/1992 | Varela, Jr. | |
| 5,327,991 A | 7/1994 | Yoshida | |
| 5,415,245 A | 5/1995 | Hammond | |
| 5,637,987 A | 6/1997 | Fattic et al. | |
| 5,644,200 A | 7/1997 | Yang | |
| 5,988,307 A | 11/1999 | Yamada et al. | |
| 6,198,238 B1 | 3/2001 | Edelson | |
| 6,202,776 B1 * | 3/2001 | Masberg et al. .......... | 180/65.2 |
| 6,205,379 B1 | 3/2001 | Morisawa et al. | |
| 6,209,672 B1 * | 4/2001 | Severinsky ............... | 180/65.2 |
| 6,307,276 B1 | 10/2001 | Bader | |
| 6,331,365 B1 | 12/2001 | King | |
| 6,349,782 B1 | 2/2002 | Sekiya et al. | |
| 6,369,532 B1 | 4/2002 | Koenen et al. | |
| 6,394,209 B1 | 5/2002 | Goehring et al. | |
| 6,419,040 B1 | 7/2002 | Kitano et al. | |
| 6,427,100 B1 | 7/2002 | Kaku et al. | |

(Continued)

*Primary Examiner*—Bentsu Ro
(74) *Attorney, Agent, or Firm*—Dickinson Wright PLLC

(57) ABSTRACT

The present invention includes a power drive electronics apparatus connected between a frequency variable generator and an electric motor. The power drive electronics apparatus includes a three-phase diode rectifier having a three-phase AC input, a positive DC output terminal and a negative DC output terminal. A capacitor is connected between the positive DC output terminal and said negative DC output terminal. The three-phase AC input is operably connected to the electric motor and the positive DC output terminal is operably connected to the frequency variable generator's rotor winding. The power drive apparatus also includes a diode having an anode and a cathode, wherein the cathode is connected to the positive DC output terminal of the three-phase diode rectifier, and the anode is connected to a battery.

12 Claims, 16 Drawing Sheets

U.S. PATENT DOCUMENTS

| | | |
|---|---|---|
| 6,427,794 B1 | 8/2002 | Raftari et al. |
| 6,434,469 B1 | 8/2002 | Shimizu et al. |
| 6,578,649 B1 * | 6/2003 | Shimasaki et al. ......... 180/65.2 |
| 2002/0038733 A1 | 4/2002 | Obayashi |
| 2002/0046889 A1 | 4/2002 | Kunitake et al. |
| 2003/0019674 A1 | 1/2003 | Duan |
| 2003/0037977 A1 | 2/2003 | Tatara et al. |
| 2004/0084035 A1 | 5/2004 | Newton |

* cited by examiner

POWER ELECTRONICS APPARATUSES FOR DOUBLE-FED INDUCTION GENERATOR TO INDUCTION MOTOR DRIVE SYSTEM

BACKGROUND OF THE INVENTION

1. Technical Field

The present invention generally relates to a multi-axle vehicle where one of the drive axles is driven by an electric motor. More particularly, it is related to the control of an all-wheel-drive vehicle's drive system.

2. Discussion

Four wheel drive systems in vehicles selectively or continuously communicate driving torque to primary (e.g., front) and/or secondary (e.g., rear) axles as well as bias torque between right and left wheels of an axle. Some conventional four wheel drive vehicles include an internal combustion engine that drives the primary axle and an electric motor that drives the secondary axle. These hybrid systems eliminate the need for a mechanical drive shaft extending between the primary and secondary axles thereby reducing the overall weight of the driveline and improving packaging options.

A four wheel drive system distributes engine power to the four wheels of a vehicle. The four wheel drive system uses two AC machines, a frequency variable generator (FVG) and an electric motor, to take power from the originally driven wheels, send the power from the originally driven wheels by electrical means and drive the originally un-driven wheels. The FVG generates the system power by converting the mechanical power to electrical power. The electric motor converts the electric power back to mechanical power. The mechanical power is used to deliver torque to enhance the automobile's tractive effort. The system transfers power from the engine to the rear wheels by first converting the mechanical power to electrical power using the FVG, and then transmitting the electrical power to the electric motor using electric power cables, and finally converting the electric power back to mechanical power using the electric motor.

Add-on, electric, all-wheel-drive schemes are becoming more predominant for original equipment manufacturers (OEMs), especially as the number of hybrid electric vehicles and electric vehicle considerations continue to grow. Generally speaking "all-wheel-drive" implies permanently engaged or automatically engaging four wheel drive. Different power electronics methods and apparatuses offer advantages from simplistic to sophisticated for the control of multi-phase power and torque delivery systems. These power and torque delivery systems typically consist of an electric generator connected, via phases, to an electric motor actuator or electric motor axle system which delivers the torque to the vehicle wheels.

Transmitting power by electrical means eliminates the mechanical shaft, which adds weight and is difficult to package. Another advantage of electric machine to electric machine systems is that they draw less power from the power drive electronics. The amount of power that is sent to the originally un-driven wheels can be controlled by the FVG. At a given FVG shaft speed, the amount of power transferred is controlled by electronically varying the FVG output power electrical frequency and magnitude. The magnitude of the FVG output power is a function of the magnitude of the excitation magnetic field, which in turn, is a function of the magnitude of the FVG rotor current. An inverter drives and controls the FVG rotor current by initially taking current from the vehicle battery and driving the FVG rotor winding.

SUMMARY OF THE INVENTION

In view of the above, the described features of the present invention generally relate to one or more improved systems, methods and/or apparatuses for controlling power delivered to an electric all-wheel-drive system by using un-regulated power within an all-wheel-drive system to supply power to the electrical generator for controlling an actuated torque output.

In one embodiment, the invention includes a power electronics apparatus operably connected between a frequency variable generator and an electric motor. The apparatus includes a three-phase diode rectifier having a three-phase AC input, a positive DC output terminal, and a negative DC output terminal. The three-phase AC input is operably connected to the electric motor and the positive DC output terminal is operably connected to the frequency variable generator's rotor windings. The apparatus also includes a diode having an anode and a cathode, wherein the cathode is operably connected to the positive DC output terminal of the three-phase diode rectifier, a battery operably connected to the anode of the diode, and a capacitor operably connected between the positive DC output terminal and the negative DC output terminal of the three-phase diode rectifier.

In another embodiment, the power electronics apparatus further includes a switch having a first terminal and a second terminal, wherein the first terminal of the switch is operably connected to the battery and the second terminal of the switch is operably connected to the anode of the diode.

In a further embodiment, the power electronics apparatus further includes at least one high side switch and a controller. The high side switch has a first terminal operably connected to the positive DC output terminal of the three-phase diode rectifier, a second terminal operably connected to the frequency variable generator's rotor winding, and a control terminal. The controller is operably connected to the control terminal of the at least one high side switch.

In another embodiment, the power electronics apparatus further includes an inverter and a controller operably connected to the inverter. The inverter has a three-phase AC output, a positive DC input terminal and a negative DC input terminal. The positive DC input terminal is operably connected to the positive DC output terminal of the three-phase diode rectifier, the negative DC input terminal is operably connected to the negative DC output terminal of the three-phase diode rectifier, and the three-phase AC output is operably connected to the frequency variable generator's rotor winding.

In another embodiment, the power electronics apparatus includes an energy absorber operably connected between the positive DC output terminal and the negative DC output terminal of the three-phase diode rectifier.

In a further embodiment, the invention includes a method of controlling magnitude and frequency of power delivered to a rotor winding of a generator. The method includes the steps of applying system power to the rotor windings of the generator, disconnecting the system power, rectifying ac power from a motor, pulse width modulating the rectified ac power, and applying the pulse width modulated rectified ac power to the rotor winding of the generator.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
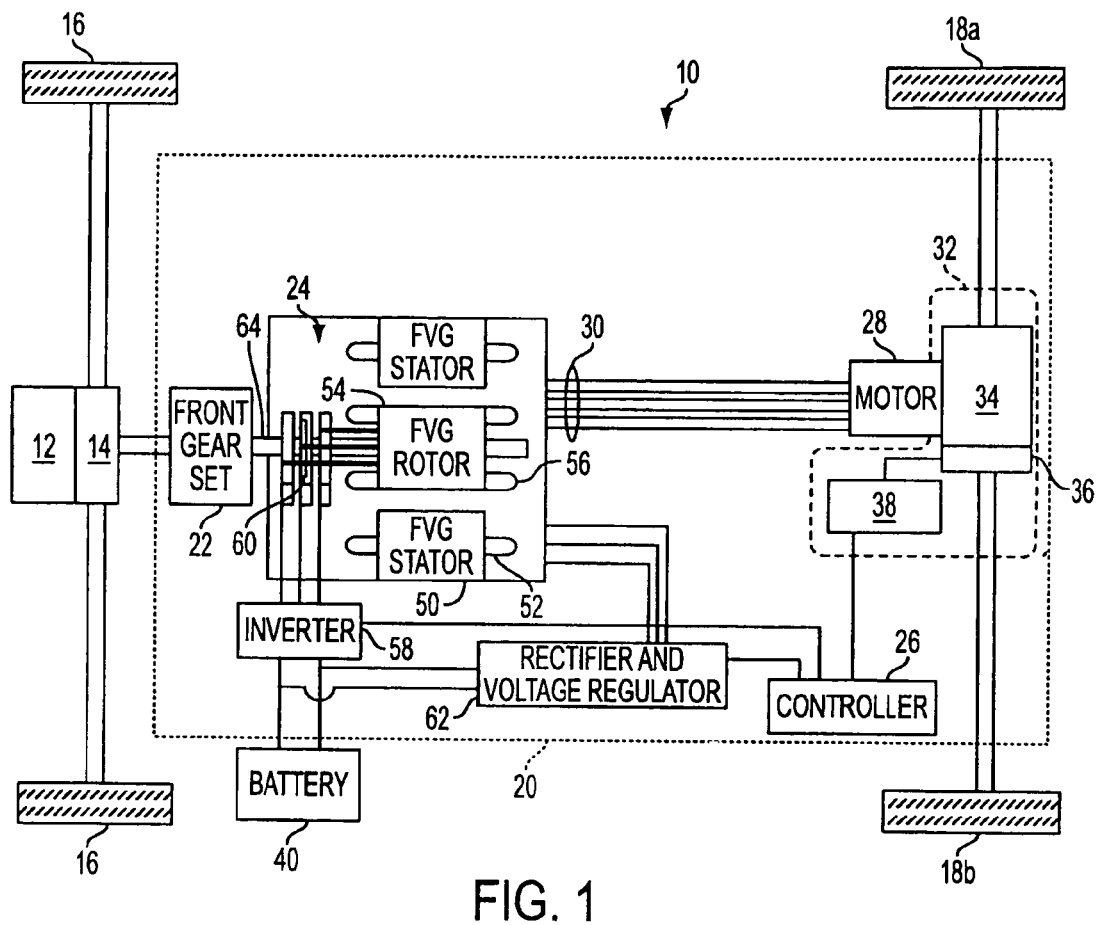
FIG. 1 is a block diagram of an electric all-wheel drive system.
Figure 2:
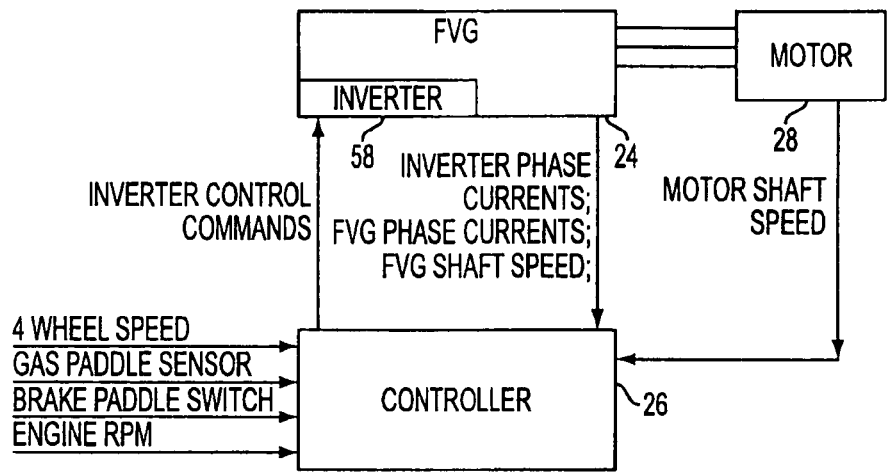
FIG. 2 is a schematic representation of a controller interacting with the frequency variable generator and motor of the electric all-wheel drive system of FIG. 1.
Figure 3:
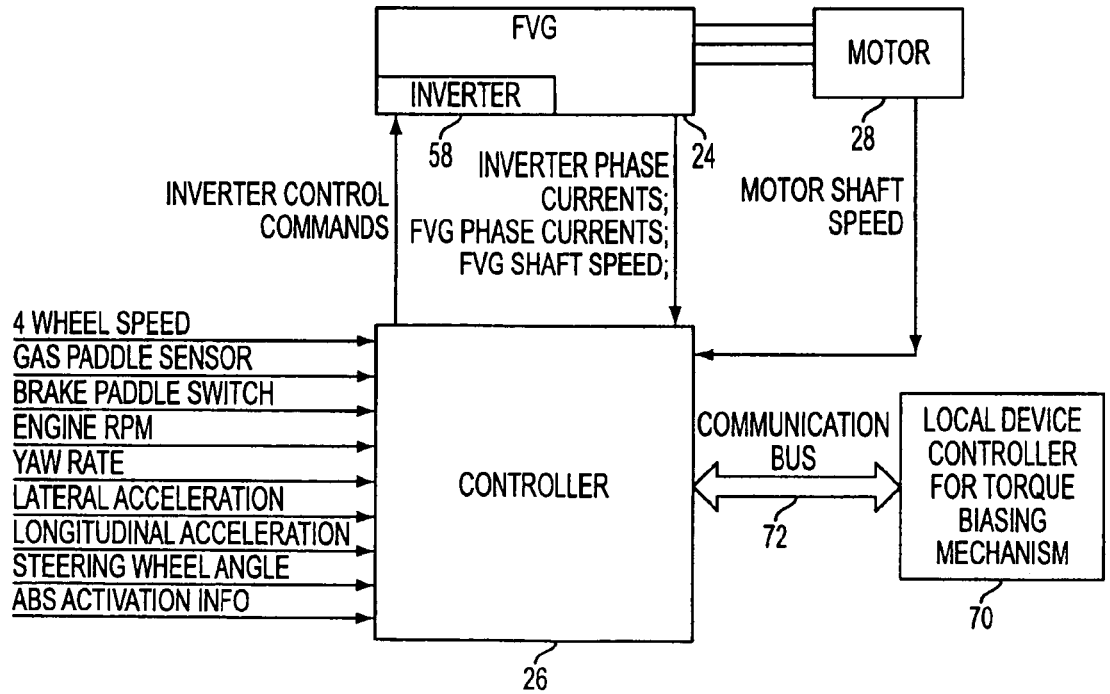
FIG. 3 is a schematic representation of a controller interacting with the frequency variable generator, motor, and a local device controller of the electric all-wheel drive system of FIG. 1.

The present invention is generally directed to an apparatus and method for controlling an electric drive system in an all-wheel-drive system. As is schematically illustrated in FIG. 1, the vehicle 10 includes an engine 12 and transmission 14 mechanically coupled to primary drive wheels 16 in a conventional manner. Secondary or auxiliary drive wheels 18a and 18b are powered by a secondary drive assembly 20 that receives mechanical drive power from a front gear set 22 via an output 64. The secondary drive assembly includes a frequency-variable-generator 24, controller 26, and electric motor 28. Motor 28 receives power from the FVG 24 via cables 30 and provides mechanical drive power to a torque distribution mechanism 32 that selectively distributes torque to the auxiliary drive wheels 18a and 18b.

In the illustrated embodiment, the torque distribution mechanism 32 includes a gear set and differential 34, a torque biasing actuator 36, and a local device controller 38 operatively coupled to the rear gear set and differential 34 and/or torque biasing actuator 36 to control the biasing of drive torque between the right and left auxiliary drive wheels 18a and 18b.

A variety of techniques are used to control the power communicated to, and the torque generated by, the electric motor 28. In classical, industrial power system configurations, a "Static Scherbius Drive" configuration has been used to control electric machines. Notwithstanding the diversity of these known techniques, a need remains for an all wheel drive system which uses un-regulated power to supply power to the FVG 24. By using un-regulated power, less power and fewer electronic components are used than would be to directly control an electrical motor of the same size.

Figure 4:
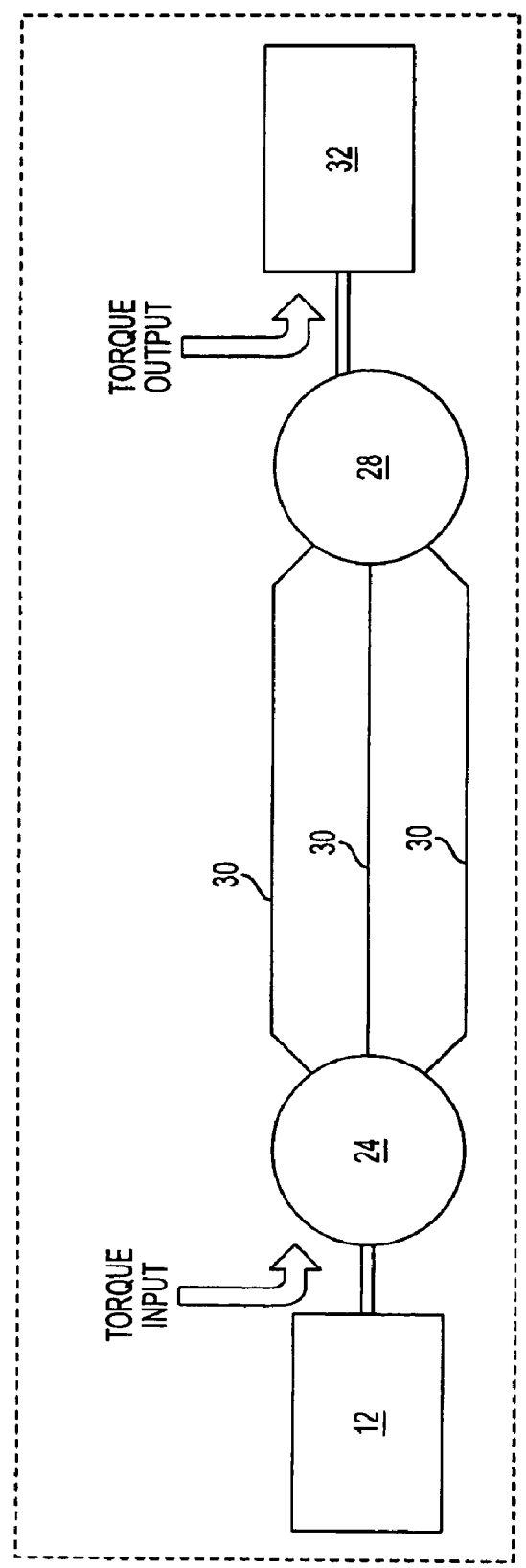
FIG. 4 is a block diagram of the basic framework of the electric all-wheel drive system of FIG. 1.

One of the features of the present invention is to provide electrical power to a vehicular, auxiliary drive system 34, 36 for use with all-wheel-drive (AWL). More specifically, the present invention is a method and apparatus for controlling power delivered to electric all-wheel-drive systems like the one disclosed in FIG. 4. The four-wheel-drive vehicle 10 includes an engine 12 and transmission 14 mechanically coupled to primary wheels 16 in a conventional manner. The FVG 24 shown in FIG. 5 delivers power to the motor 28 via cables 30 and provides mechanical drive power to a torque distribution mechanism 32 that selectively distributes torque to the auxiliary drive wheels 18a and 18b. The drive torque is delivered to the rear gear set and differential 34 by the motor 28. Thus, the power electronics apparatus 27 controls the generator-motor arrangement in the context of the vehicle application and can have multiple embodiments. The electric machine design characteristics and overall system response goals determine the power drive electronics apparatus 27 embodiment used. The power drive electronics apparatus disclosed in this invention is represented by box 27 disclosed in FIG. 5.

Figure 5:
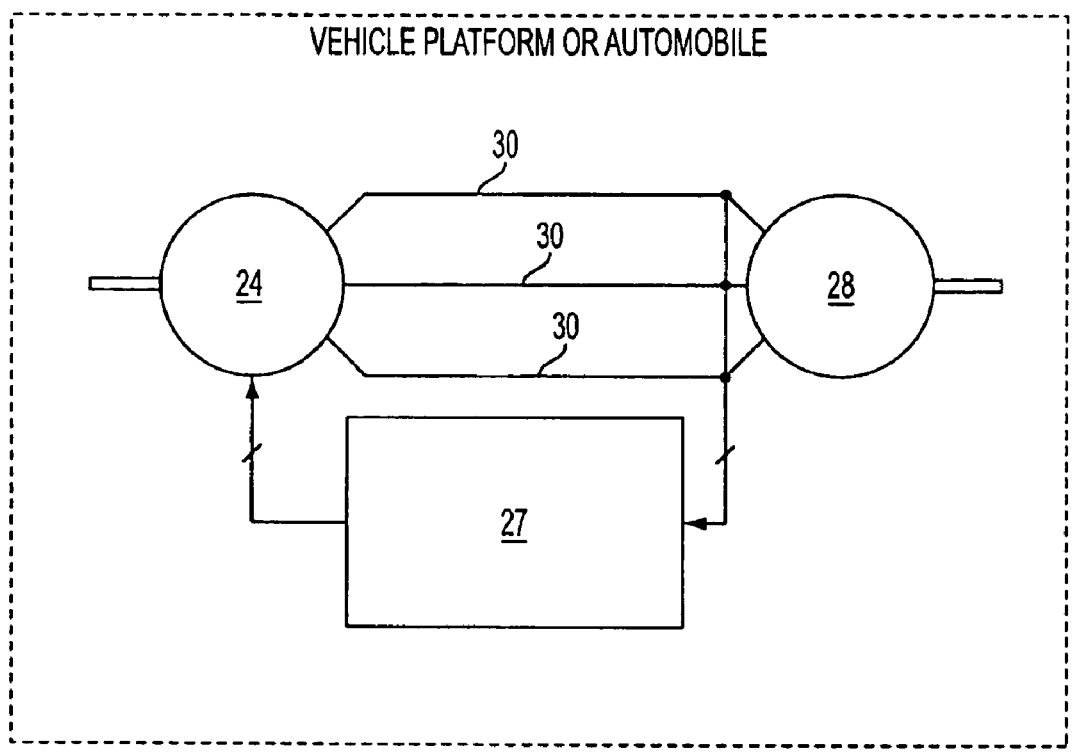
FIG. 5 is a block diagram of the basic framework of the electric all-wheel drive system of FIG. 1 with a power drive electronics apparatus.
Figure 6:
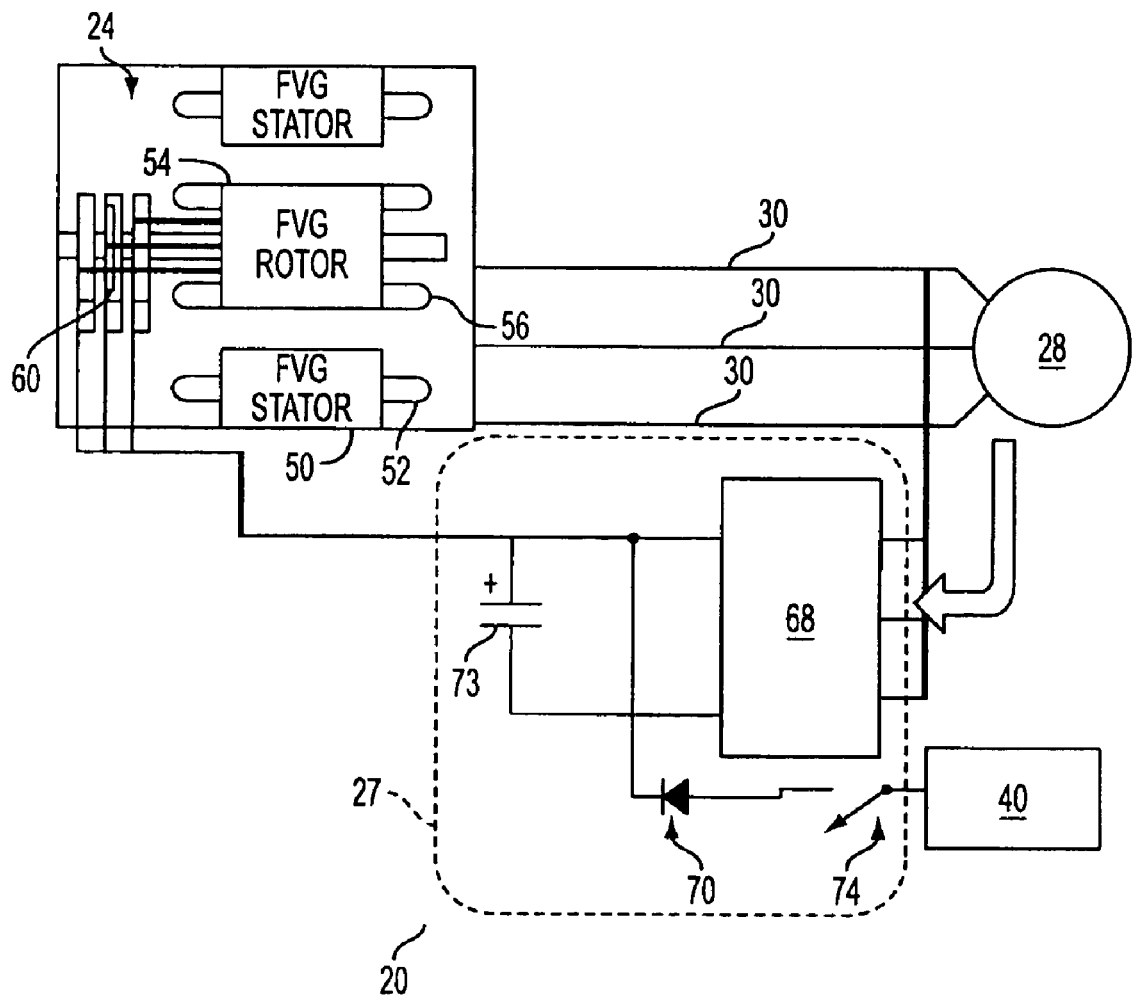
FIG. 6 is a block diagram of a first embodiment of the power drive electronics apparatus of FIG. 5 including a simple power activation apparatus.

The power drive electronics apparatus 27 controls the electrical energy supplied to the electric motor 28 and, in general, can include one or more of the following electronic devices: a controller 26 (FIG. 6), a rectifier 68 (FIG. 7), high side switching devices 75, 77, and 79 (FIG. 8), an inverter 58 (FIG. 11), an on/off switch 74 (FIG. 6), as well as a diode 70 (FIG. 6) and a capacitor 74 (FIG. 6). Four separate embodiments of the power drive electronics apparatus 27 are illustrated in FIGS. 5 through 18 and described in detail below. In each of these embodiments, the power drive electronics apparatus 27 functions to supply power to the electrical generator 24, via the generator's rotor 54, for controlling actuated torque output.

Each of the embodiments of the power electronics apparatus have benefits over the power drive electronics disclosed in the prior art. For example, one benefit of the power system configuration of FIG. 5 is that the applied power is less than the amount that would be required to directly control an electrical motor of the same size. If a 25 kilowatt motor is employed in the system, a power electronics module capable of supplying 25 kilowatts of power would generally be necessary. However, with an electric machine to electric machine driven system, only the power for the generator's rotor 54, typically only a fraction of the overall system power, is necessary to produce the desired result at the actuator. The power drive electronics apparatus 27 uses various methods of applying electrical power to an electric machine (generator) 24 to electric machine (motor) 28 system within the context of a mobile or vehicular system as shown in FIG. 5. Other benefits include low cost because of the small number of components, a simple configuration for delivering power to the FVG's rotor 54, control over torque, control over the slip parameters, and improved failsafe monitoring.

A general description of common aspects of the power-drive electronics apparatus will now be provided followed by a description of the structure and operation unique to each embodiment. The power drive electronics 27 of the present invention uses the controller 26, the rectifier 68, high side switching devices 75, 77, and 79, the inverter 58, the on/off switch 74, the diode 70 and the capacitor 74 to control power management within the drive system 20. The controller 26 communicates with the inverter 58 and is configured to control the magnitude and frequency of the power communicated from the inverter 58 to the rotor winding 56. More particularly, the controller 26 generates inverter 58 control commands that cause the inverter 58 to feed power to the rotor winding 56 with the desired magnitude and frequency.

Figure 9:
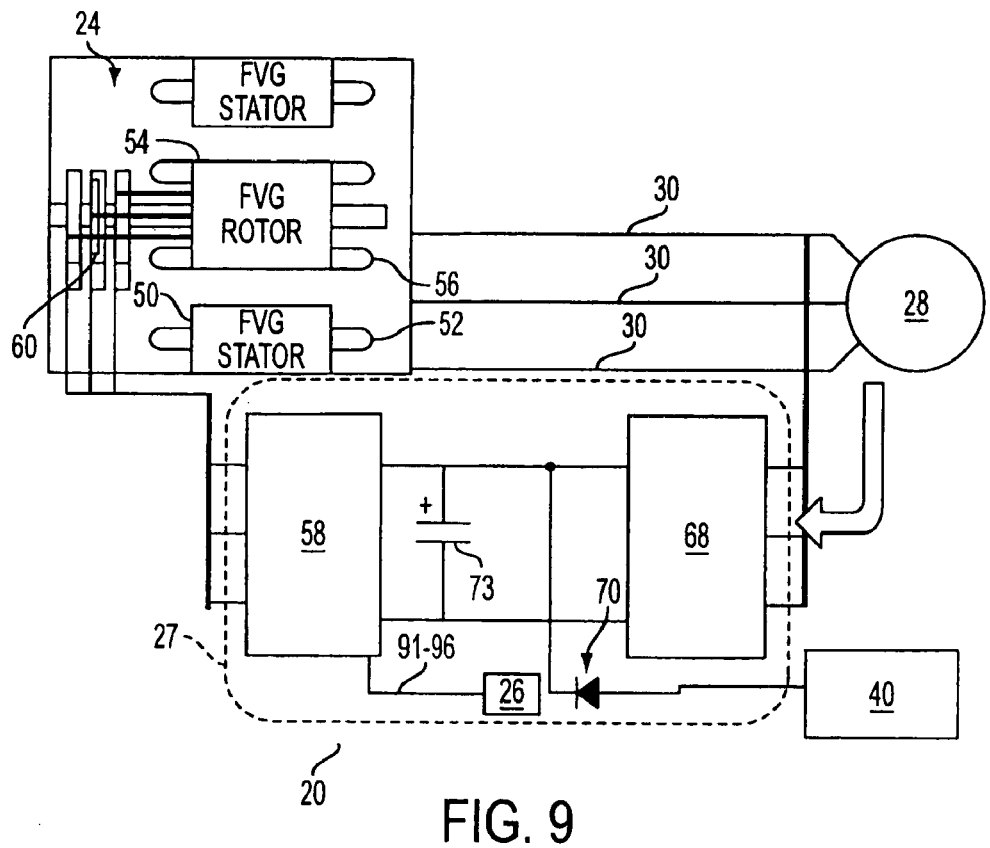
FIG. 9 is a block diagram of a third embodiment of the power drive electronics apparatus of FIG. 5, including a three-phase rectification with FET-based inverter control apparatus.
Figure 10:
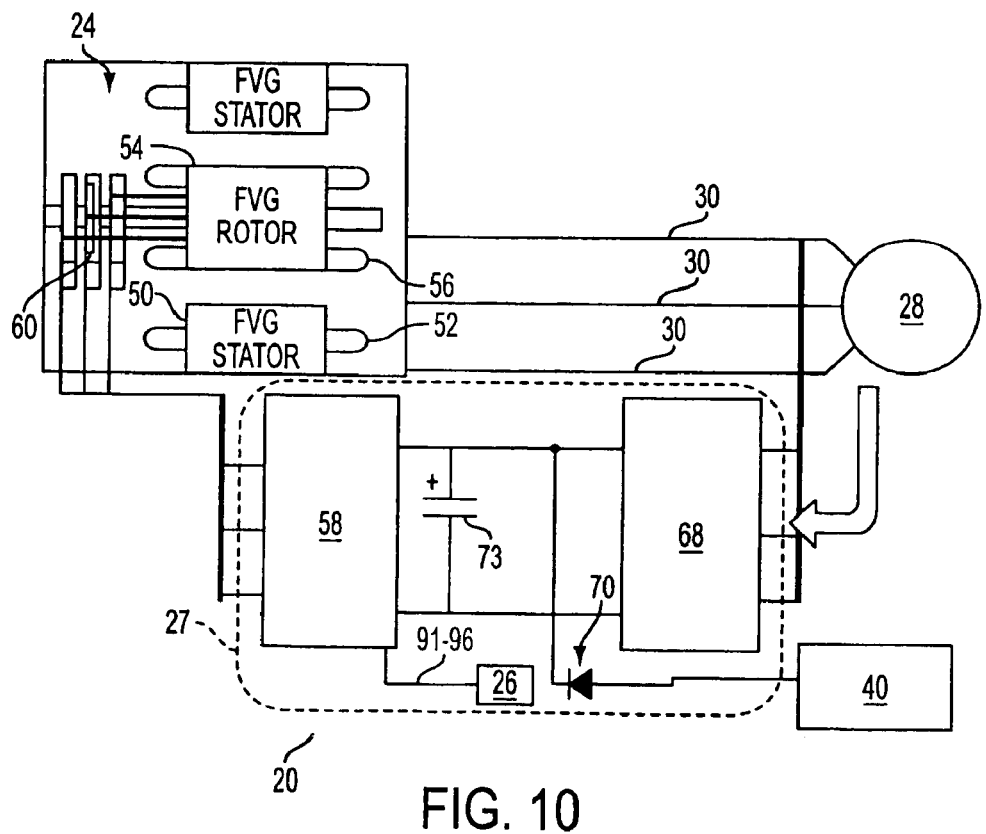
FIG. 10 is a block diagram of the third embodiment of the power drive electronics apparatus of FIG. 5, having an IGBT-based inverter as the control apparatus.

In FIGS. 9 and 10, the inverter 58 receives electrical power from the battery 40 and then transmits power to the rotor 54 of the FVG 24. The inverter 58 converts DC power to AC power, excites a rotational electric field within the FVG 24, and may receive a regulated DC voltage from a rectifier 68. In addition, the inverter 58 can receive an un-regulated DC voltage in response to which the inverter 58 generates a stable AC current that is applied to the generator 24. The inverter 58 then communicates variable frequency, three phase AC power to the rotor windings 56 via the slip rings and brushes 60. The present invention uses un-regulated power to supply power to the FVG 24 by using the inverter 58, in conjunction with other components, to feed current into the rotor 54 of the generator 24.

As stated above, the power drive electronics of the present invention is to supply electrical power to the rotor 54 of the induction generator or FVG 24 based upon controller commands. The control module 26 of the all-wheel-drive system of the present invention calculates the amount of power that can be transferred at certain shaft speeds and the amount of power needed by the rear wheels at a certain vehicle state, and causes the inverter to feed current with a certain magnitude and frequency to the FVG rotor so that the proper amount of power is transferred.

In addition, based on the vehicle state, the controller 26 determines how the total power delivered to the rear wheels 18a, 18b is to be divided between the left auxiliary wheel 18a and the right auxiliary wheel 18b. The controller 26 sends this information to the local device controller 38, which then causes the torque biasing mechanism 36 to bias the torque accordingly. The controller 26 monitors the mechanical and electrical relative slip angle(s) and determines the power to apply to the FVG rotor windings 56 to achieve the desired effect.

In a preferred embodiment, the electric motor is implemented within an actuator axle subsystem in which the axle is operated by an electric motor. The electric motor type could be any type sized for this application; for example an induction motor, a switched-reluctance motor, etc. Similarly, the generator could be any one of various types. In a preferred embodiment, the generator is a FVG known as a double-fed induction generator (DFIG) 24 and the electric motor is an induction motor (IM) 28.

A description of the structure and operation of a synchronous motor will now be provided. A typical synchronous generator consists of a magnetic field that is mounted and rotated inside a stationary winding, called the stator 50. The generator shaft, or rotor 54, is turned by a mechanical prime mover. In the present invention, the mechanical prime mover is the front gear set 22 output shaft 64 which couples the rotational output from the engine 12 to the rotor 54. As the rotor 54 turns, the magnetic field is rotated, causing flux to intersect the stator windings 52 and induce an electromotive force (EMF). The rotation of the field causes the induced EMF to increase and decrease which produces a voltage at the terminals of the stator windings 52.

The speeds of the DFIG 24 output shaft and the electric motor 28 output shaft and the output frequency of the DFIG 24 will now be discussed. As noted, the DFIG 24 is mechanically connected to the output shaft 64 of the transmission through the front gear set 22, and hence shaft RPM (nDFIG) of the DFIG rotor 54 is proportional to the average front-wheel RPM (nfrontwheel) by the ratio of Rf. That is, $$nDFIG = Rf * nfrontwheel$$

In the illustrated embodiment, the electric motor 28 is mechanically connected to the rear wheels 18a and 18b through the rear gear set and differential 34. Hence, the rotational speed of the motor output shaft (nMOTOR) is proportional to the average rear-wheel RPM (nrearwheel) by the ratio of Rr. That is, $$nMOTOR = Rr * nrearwheel$$

In the present invention, the stator 50 comprises pairs of stationary field windings 52. More particularly, the DFIG stator winding 52 is a m-phase pDFIG-pole-pair armature, which generates AC power and directly drives the motor 28. The DFIG rotor winding 56 is m-phase pDFIG-pole-pair excitation winding, which is driven by the low power inverter 58 which initially takes power from the vehicle battery 40 and feeds current to the DFIG rotor winding 56. Power from the DFIG 24 may be communicated from the stator 50 to the motor 28 via cables 30 to directly drive the motor 28.

Fed by m-phase AC current with frequency of $f_{fDFIGex}$, the rotor winding 56 excites a spatial sinusoidally distributed magnetic field that rotates about the DFIG rotor 54 at a frequency of $$f_{fDFIGex}/p_{FIG}$$

In the mean time, if the rotor 54, coupled to the transmission output shaft through the front gear set 22, is rotating at a speed of nDFIG RPM, then the rotational speed of the excited magnetic field with respect to the stator 50 is $$n_{fDFIG} = n_{DFIG} + f_{fDFIGex}/p_{DFIG} * 60$$

and hence the DFIG 24 output electrical frequency is $$f_{eDFIG}=n_{fDFIG}/60 p_{DFIG}=n_{DFIG}/60 * p_{DFIG}+f_{fDFIGex} \qquad (1)$$

Equation (1) shows that at a certain DFIG 24 shaft speed $n_{DFIG}$, and frequency $f_{eDFIG}$ can be controlled within a certain range by varying $f_{fDFGex}$.

Thus, the magnitude of the DFIG 24 output power is a function of the magnitude of the excitation magnetic field, which in turn, is a function of the magnitude of the DFIG rotor 56 current. Therefore, by controlling the frequency and magnitude of the FVG rotor 56 current, the amount of power transferred by the FVG 24 can be controlled.

With the above description of the speeds of the DFIG 24 output shaft and the electric motor 28 output shaft and the output frequency of the DFIG 24, the four embodiments of the power drive electronics apparatus will now be described in detail. These embodiments include: i) a simple power activation method and apparatus, ii) a method and apparatus of limited control power activation, iii) a three-phase rectification with FET-based (or IGBT-based) inverter control method and apparatus, and iv) a three-phase rectification with FET-based inverter and braking option method and apparatus.

Figure 7:
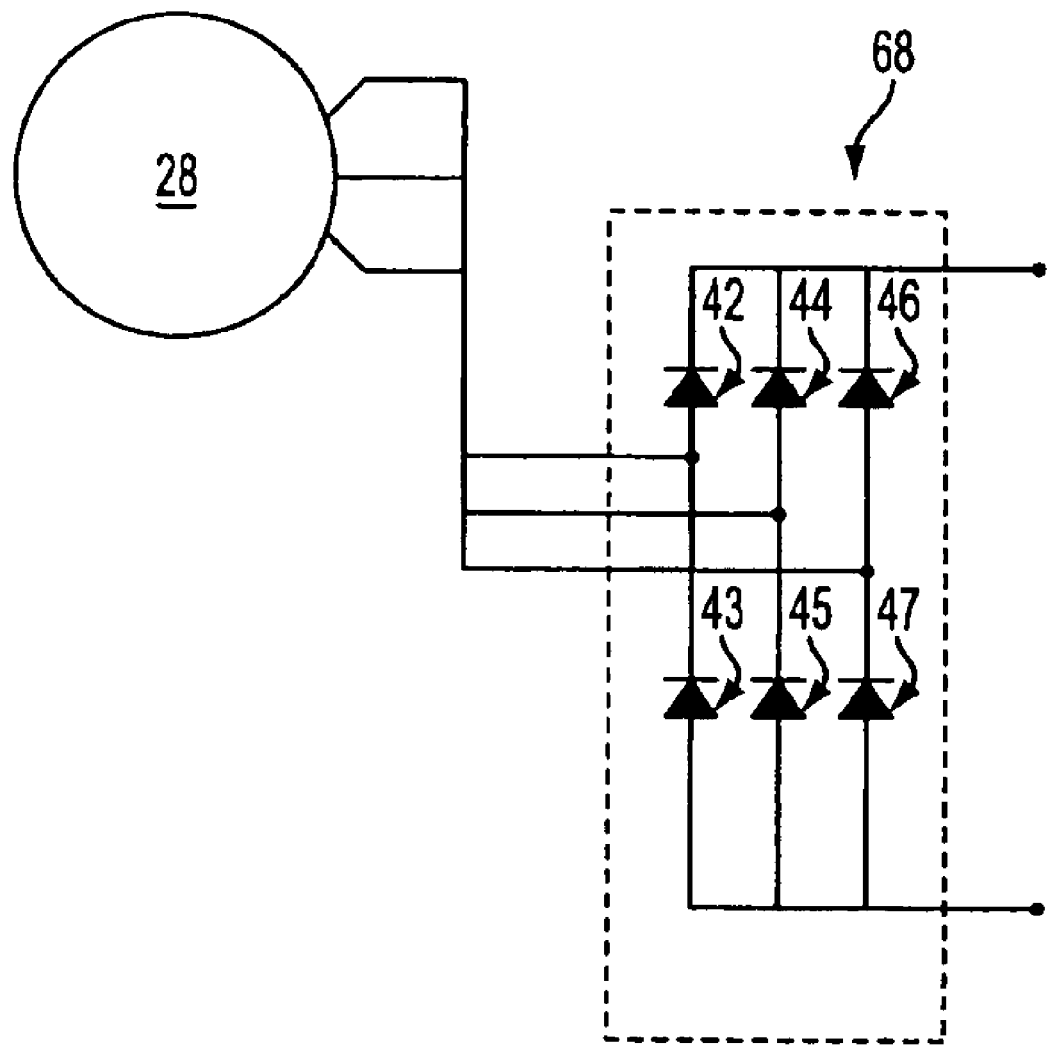
FIG. 7 is a block diagram of a diode rectifier.

FIGS. 6 and 7 show a first embodiment of the power drive electronics apparatus 27 which will be referred to herein as a "Simple Power Activation Method and Apparatus" and/or, for simplicity, Apparatus (or Method) 101. The Simple Power Activation Method and Apparatus 101 includes a power drive electronics apparatus 27 operably connected between a frequency variable generator 24 and an electric motor 28. The apparatus 27 includes a three-phase diode rectifier 68 having a three-phase AC input, a positive DC output terminal and a negative DC output terminal, wherein the three-phase AC input is operably connected to the electric motor 28 and the positive DC output terminal is operably connected to the frequency variable generator's rotor windings 56, a diode 70 having an anode and a cathode, wherein the cathode is operably connected to the positive DC output terminal of the three-phase diode rectifier 68, a battery 40 operably connected to the anode of the diode 70, and a capacitor 73 operably connected between the positive DC output terminal and said negative DC output terminal of the three-phase diode rectifier 68. The Simple Power Activation Method and Apparatus 101 further includes a switch 74 having a first terminal and a second terminal, wherein one terminal of the switch 74 is operably connected to the battery 40 and a second terminal of the switch 74 is operably connected to the anode of the diode 70.

The Simple Power Activation Method and Apparatus 101 operates in the following manner. Initially, power is obtained from the system's twelve volt battery 40 via a diode 70 connected to the DC power bus. The diode 70 protects the vehicle's twelve volt battery 40 by allowing current to flow in only one direction, from the 12 volt battery 40 to the double fed induction generator's DFIG rotor 54. An on/off switch 74 selectively disconnects the system's twelve volt system 40 after start-up. A capacitor 73 filters any ripple appearing on the DC power input to the DFIG rotor 54. Once power is applied statically via the vehicle's twelve volt based voltage, both the generator's 24 and the motor's 28 individual speed and slip characteristics and conditions will deliver a limited amount of torque in an uncontrollable manner. The reason that the torque is delivered this way is because the magnitude of the DC voltage delivered to the DFIG can't be changed since diodes are used in the rectifier and not switching elements. Thus, the motor drive system 20 won't respond to changes in the motor drive system's 20 torque requirements. The voltage levels are dictated by the motor drive system 20 state of the frequency slip(s) of the two electric machines.

The Simple Power Activation Method and Apparatus 101 operates the motor drive system 20 in one direction of travel because the three-phase diode rectifier 68 allows application of power for only one polarity of slip between the two machines 24 and 28; i.e. no negative power flow. The direction of power flow is defined relative to the direction of the generator's 24 power flow. Thus, the vehicle's velocity and direction of travel is monitored before application of DC power to ensure the power is in accordance with the vehicle's present dynamic state (i.e. direction of travel). Applying power in the wrong direction when the vehicle is moving could add or subtract torque in an unintended fashion.

A three-phase diode rectifier 68 rectifies incoming three-phase AC power received from the motor 28 to a set DC level according to the 0.7 volt drop across each diode 42–47 in the three phase diode rectifier 68. Typical input voltages are up to 600 Volts AC peak-peak. The rectified power is then output to the DFIG rotor windings 56.

A circuit diagram of the 3-phase diode rectifier 68 is shown in FIG. 7. The diode rectifier 68 consists of two series diodes per phase leg, i.e., diodes 42 and 43 form a first phase leg, diodes 44 and 45 form a second phase leg and diodes 46 and 47 form a third phase leg. The three-phase diode rectifier 68 has a three-phase AC input operably connected to the electric motor 28, a positive DC output terminal operably connected to the DFIG rotor winding 56 and a negative DC output terminal. Advantages provided by the Simple Power Activation Method and Apparatus include low cost because of the small number of components, a simple configuration for delivering power to the DFIG's rotor 54, and ability to turn the power on and off.

Figure 8:
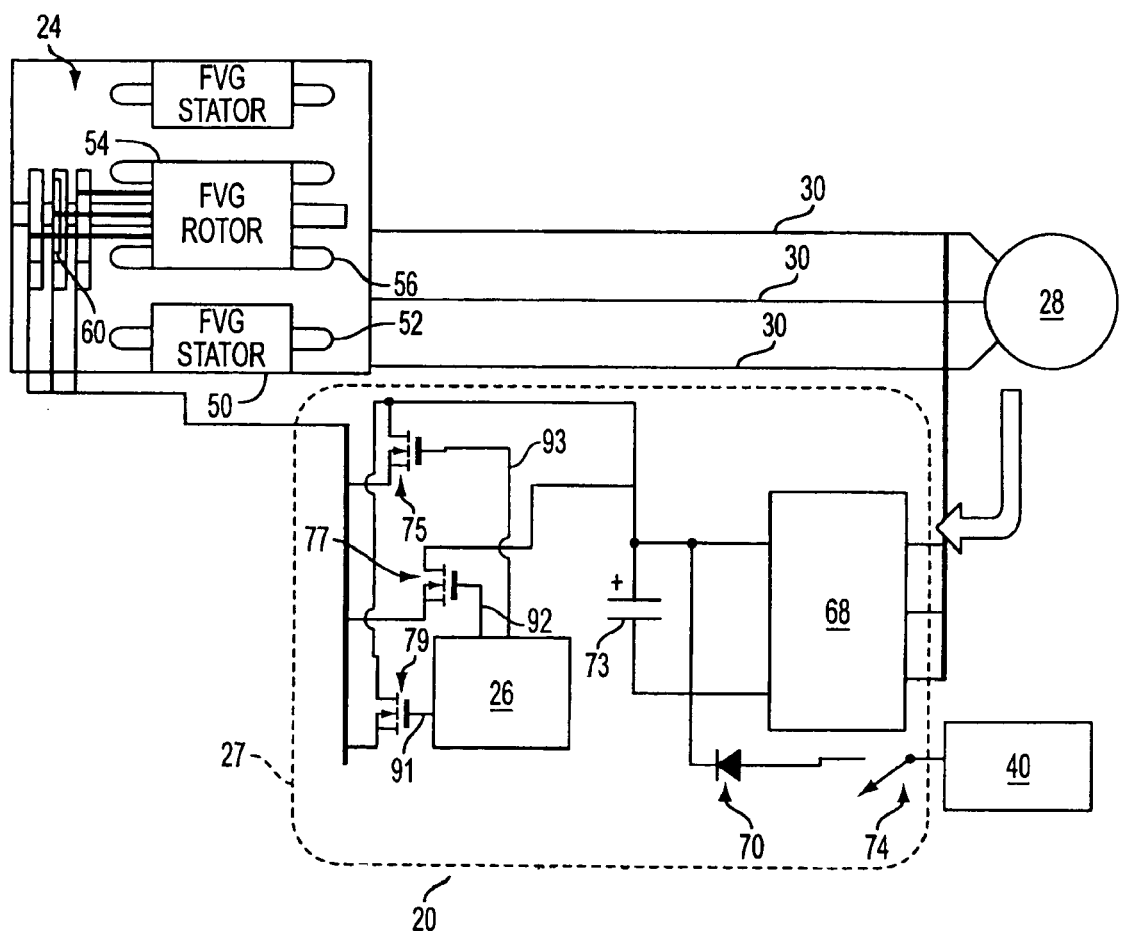
FIG. 8 is a block diagram of a second embodiment of the power drive electronics apparatus of FIG. 5 including a limited control power activation apparatus.

A second embodiment of the power drive electronics apparatus 27 will now be described with reference to FIG. 8. This embodiment is directed to a "Method and Apparatus of Limited Control Power Activation" and is referenced to herein as Apparatus (or Method) 102. In addition to the features disclosed in the Simple Power Activation Method and Apparatus 101, three high side switching devices, 75, 77 and 79 are operably connected between the three-phase diode rectifier 68 and the rotor 54 of the DFIG 24. The switches are conventional semiconductor switching devices such as, for example, IGBT, MOSFET, GTO, SCR or IGCT type devices and are operably connected to the controller 26.

The Method and Apparatus of Limited Control Power Activation 102 operates in the following manner. The control signals 91, 92, and 93 output from controller 26 control the power-on time of the high side switches 75, 77, 79. The controller 26 includes a processor, a microprocessor, or any other similar processing apparatus, a memory operably connected to the microprocessor, and software stored in the memory. The software comprises instructions which generates commands used to turn the high side switches on and off. Pulse width modulation controls switches 75, 77, 79 and an AC voltage is output from the switches. Each switch is connected to one phase of the DFIG's rotor winding 56 so that each switch controls the current delivered to one winding.

Once power is applied to the DFIG's rotor windings 56 via the high side switches 75, 77, 79, both the generator's 24 and the electric motor's 28 individual speed and slip characteristics and conditions determine how much torque the motor drive system 20 delivers. Varying the operation of the switches provides limited control over the range and the desired characteristic of the torque. Operation of the switches 75, 77, 79 also provides limited control of direction and frequency of the power delivered to the generator's rotor 56. Like the Simple Power Activation Method and Apparatus 101, the Limited Control Power Activation Method and Apparatus 102 operates the drive system 20 in one direction of travel because the switches allow application of power for only one polarity of slip between the two electric machines 24 and 28, i.e., no negative power flow. In addition, the Limited Control Power Activation Method and Apparatus doesn't allow for removing power out from the rotor 54. Thus, the controller 22 monitors the vehicle's direction and velocity before application of DC power. Advantages provided by the Limited Control Power Activation Method and Apparatus 102 include low cost because of the small number of components, a simple configuration for delivering power to the DFIG's rotor 54, and limited control over torque.

A third embodiment of the power drive electronics apparatus 27 will now be described with reference to FIGS. 9–12. This embodiment is directed to a Three-Phase Rectification with FET-based (or IGBT-based) Inverter Control Method and Apparatus and is referenced to herein as Apparatus (or Method) 103. In place of the high side switching devices 75, 77, and 79 disclosed in the Simple Power Activation Method and Apparatus, a three-phase inverter 58 is operably connected between the three-phase diode rectifier 68 and the rotor 54 of the DFIG 24. The inverter 58 is used to power the double fed induction generator's DFIG rotor 54. The inverter 58 has a 3-phase AC output, a positive DC input terminal and a negative DC input terminal. The three-phase AC output is operably connected to the DFIG's rotor winding 56, the positive DC input terminal is operably connected to the positive DC output terminal of the three-phase rectifier 68 and the negative DC input terminal is operably connected to the negative DC output terminal of the three-phase rectifier 68.

Figure 11:
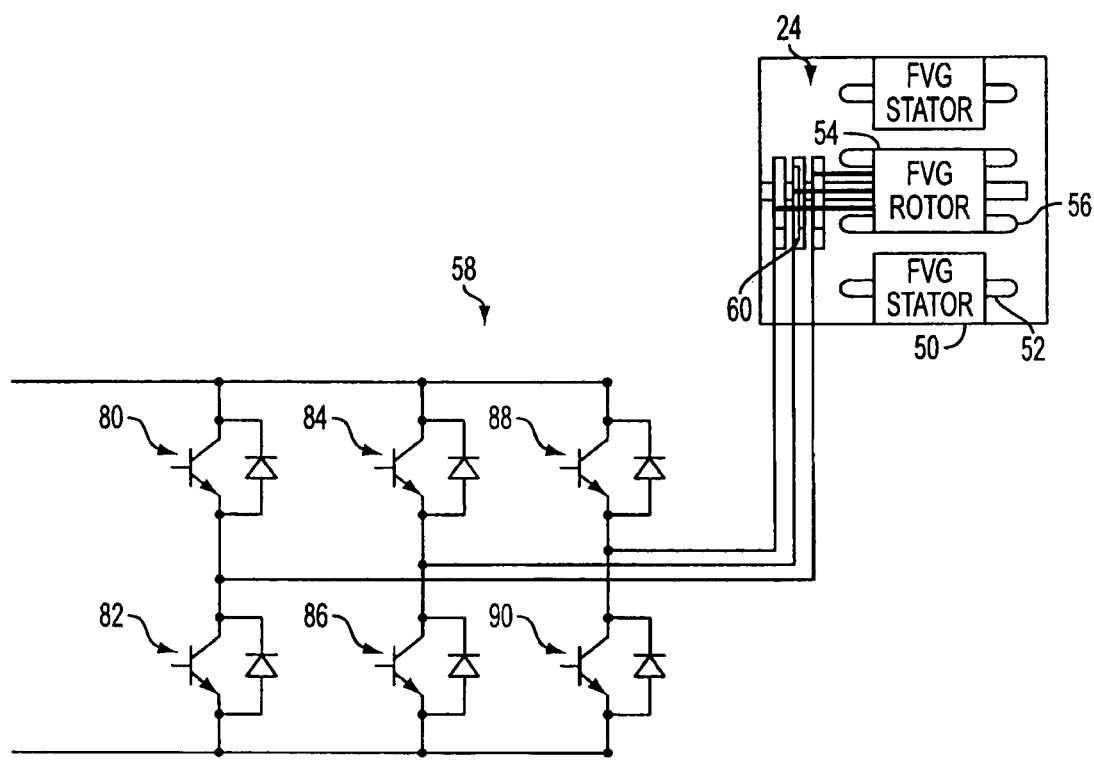
FIG. 11 is a block diagram of a three-phase transistor inverter.
Figure 12:
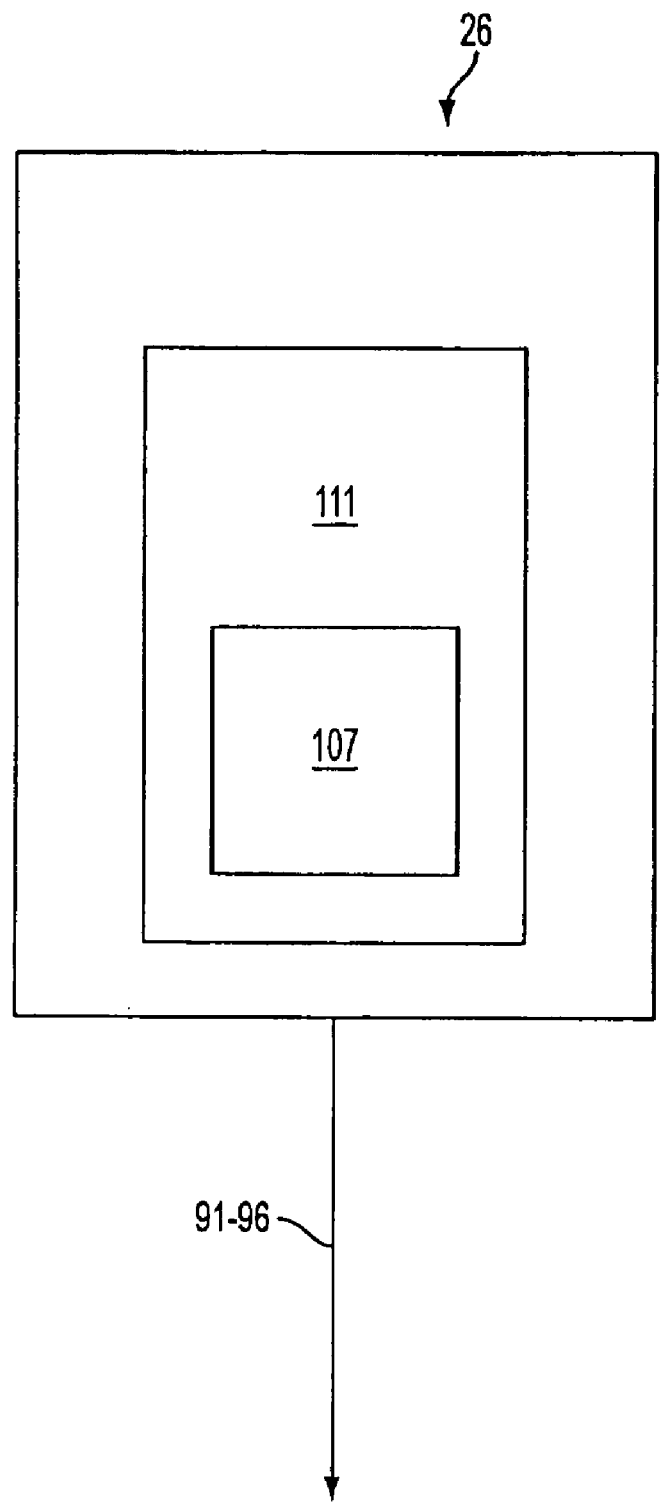
FIG. 12 is a block diagram of the controller used in the power drive electronics apparatus of the present invention.

The inverter 58 provides three-phase AC power to the motor 28 by proper gating of switching elements in the inverter 58. In FIG. 11, six transistors, 80–90, are used as the switching elements. Since in a preferred embodiment the DFIG is a three-phase machine, the inverter 58 is a three-phase inverter having two series connected switching devices per phase leg, i.e., devices 80 and 82 form a first phase leg, devices 84 and 86 form a second phase leg and devices 88 and 90 form a third phase leg. The devices 80–90 are conventional semiconductor switching devices such as, for example, IGBT, BJT, MOSFET, GTO, SCR or IGCT type devices. The control signals 91–96 output from controller 26 successively control the power-on time of the paired transistors 80 through 90 respectfully. The electric current flowing through each rotor winding 56 undergoes pulse width modulation (PWM) to give a quasi-sine wave, which enables the three-phase rotor windings 56 to form a revolving magnetic field.

In a preferred embodiment, the steps (or instructions) for controlling the paired transistors 80 through 90 shown in FIG. 11 are stored in software or firmware 107 located in memory 111. The controller 24, illustrated in block diagram fashion in FIG. 12, executes steps included in the software 107. The memory 111 can be located on the controller 24 or separate from the controller 24. The memory 111 can be RAM, ROM or one of many other forms of memory apparatuses. The controller 24 can be a processor, a microprocessor or one of many other forms of digital or analog processing apparatuses. The switches 80–90 are controlled using PWM.

The Three-Phase Rectification with FET-based (or IGBT-based) Inverter Control Method and Apparatus 103 operates in the following manner. Initially, power is obtained from the system's twelve volt battery 40 via a diode 70 connected to the DC power bus. The diode 70 protects the vehicle's twelve volt battery 40 by allowing current to flow in only one direction, from the twelve volt battery 40 to the DFIG's rotor 54. In addition, the diode 70 provides a logical "OR" function with the self-excited DC supply (i.e., the three-phase diode rectifier 68) to the DC power bus. The three-phase diode rectifier 68, illustrated in FIG. 7, acts as a self-excited DC supply and rectifies incoming three-phase AC power received from the motor 28 to a set DC level according to the 0.7 volt drop across each diode 42–47. This rectified power is then output to the inverter 58. When the output of the rectifier 68 goes above 11.3 volts (12 volts from system minus the 0.7 volt drop across the diode 70), the diode 70 biases off. At this point, DC power is only received from the self-excited three-phase diode rectifier 68.

Once the speed and resultant slip, both rotational mechanical and electrical, frequencies are in proper orientation, monitored and adjusted by a control system, power/torque can be transferred from the DFIG 24 to the motor 28 in a controlled manner because both the frequency and the magnitude of the AC voltage delivered to the DFIG rotor winding 56 is controlled by the inverter's 58 switches 80–90. In addition, use of the self-excited three-phase diode rectifier 68 allows higher DC voltages to be supplied to the inverter 58. These higher voltages for the inverter 58 offer enhanced control of the application of torque/power and also offer enhanced sizing options (e.g., wire diameters, and switching devices with lower current requirements). The extent of the control depends, in part, upon the DFIG's 24 design.

The Three-Phase Rectification with FET-based (or IGBT-based) Inverter Control Method and Apparatus 103 can be operated in either direction of travel for the vehicle because of the monitored slip frequencies. With proper monitoring, the controller 26 in this configuration offers full control over the frequency/slip parameters and can match the vehicle's condition to provide torque in a the desired fashion—usually for traction enhancement. Advantages provided by the Three-Phase Rectification with FET-based (or IGBT-based) Inverter Control embodiment 103 include full control over the slip parameters, improved failsafe monitoring through use of inverter 58 control, and a relatively low cost by using a simple diode rectifier 68 to rectify the AC output by the motor 28.

Figure 13:
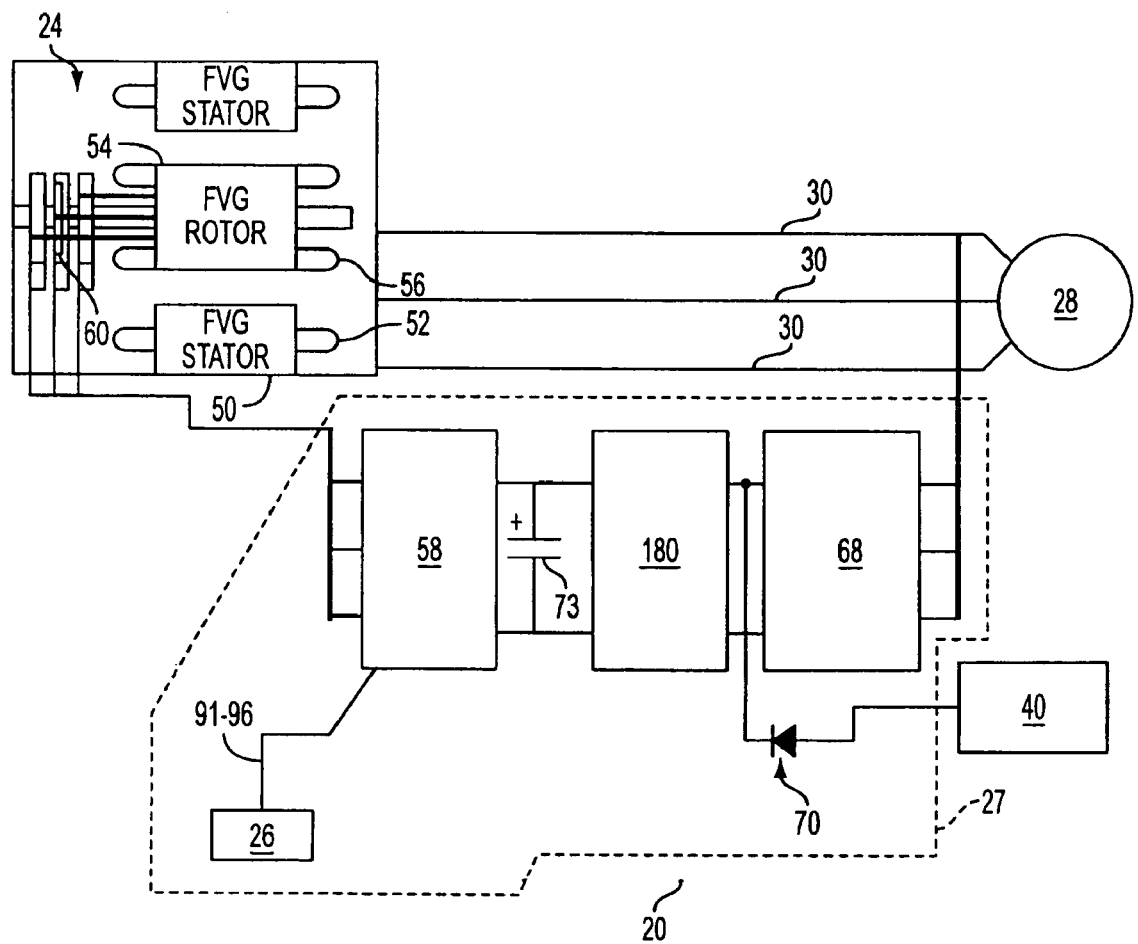
FIG. 13 is a block diagram of a fourth embodiment of the power drive electronics apparatus of FIG. 5 including a three-phase rectification with FET-based inverter and braking option apparatus.

A fourth embodiment of the power drive electronics apparatus 27 will now be described with reference to FIG. 13. This embodiment is directed to a Three-Phase Rectification with a FET-based Inverter and a Braking Option and is referenced to herein as Apparatus (or Method) 104. The Three-Phase Rectification with a FET-based Inverter and a Braking Option 104 comprises an additional feature not disclosed with the three-Phase Rectification with FET-based (or IGBT-based) Inverter Control Method and Apparatus 103 discussed above and disclosed in FIGS. 9 and 10. An energy absorber 180 is operably connected in parallel with the three-phase diode rectifier 68. The absorber 180 can absorb energy from the motor 28 when the vehicle is decelerating. The absorbed energy can be dissipated or recaptured depending on the application. The energy absorption is controlled by the power electronics apparatus 27 frequency and the apparatus's 27 relative slip to the frequency of the generator 24/motor 28. For example, if a battery is used as the energy absorber 180, energy is recaptured. On the other hand, if a power resistor is used, the energy is dissipated. Advantages provided by this embodiment include full control over the slip parameters, and energy regenerative capabilities.

Figure 14:
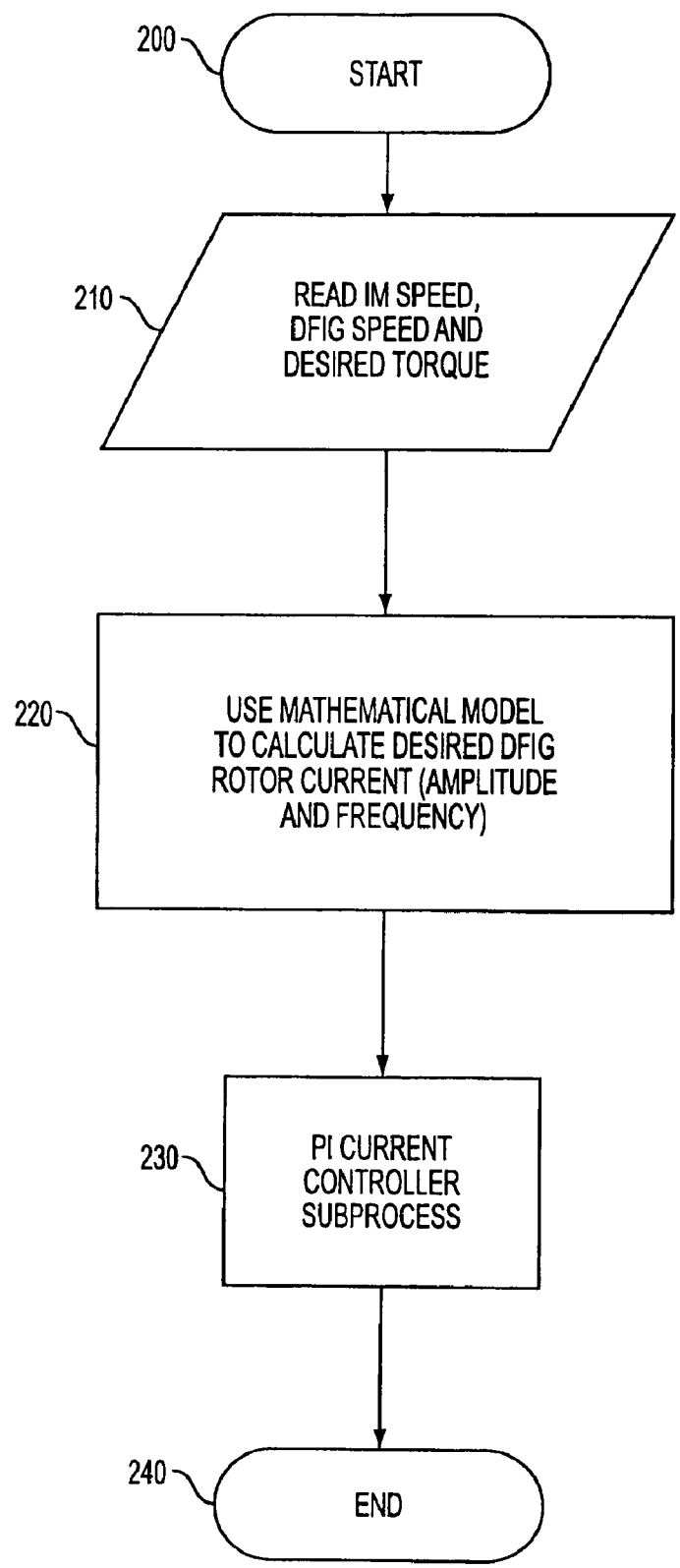
FIG. 14 is a flowchart disclosing the steps taken in the induction motor torque control main process.
Figure 15:
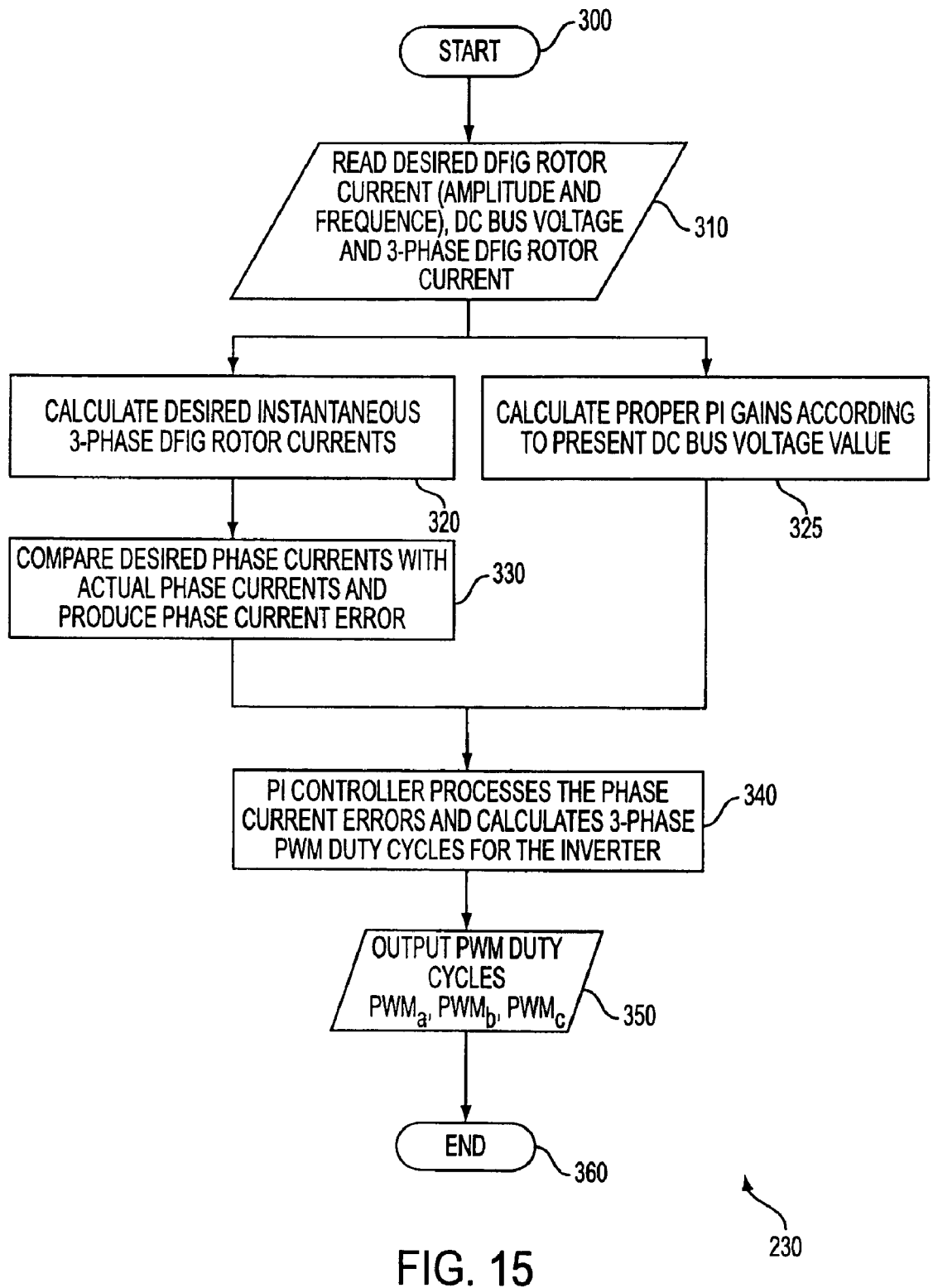
FIG. 15 is a flowchart disclosing the steps taken in the proportional and integration current controller sub-process.
Figure 16:
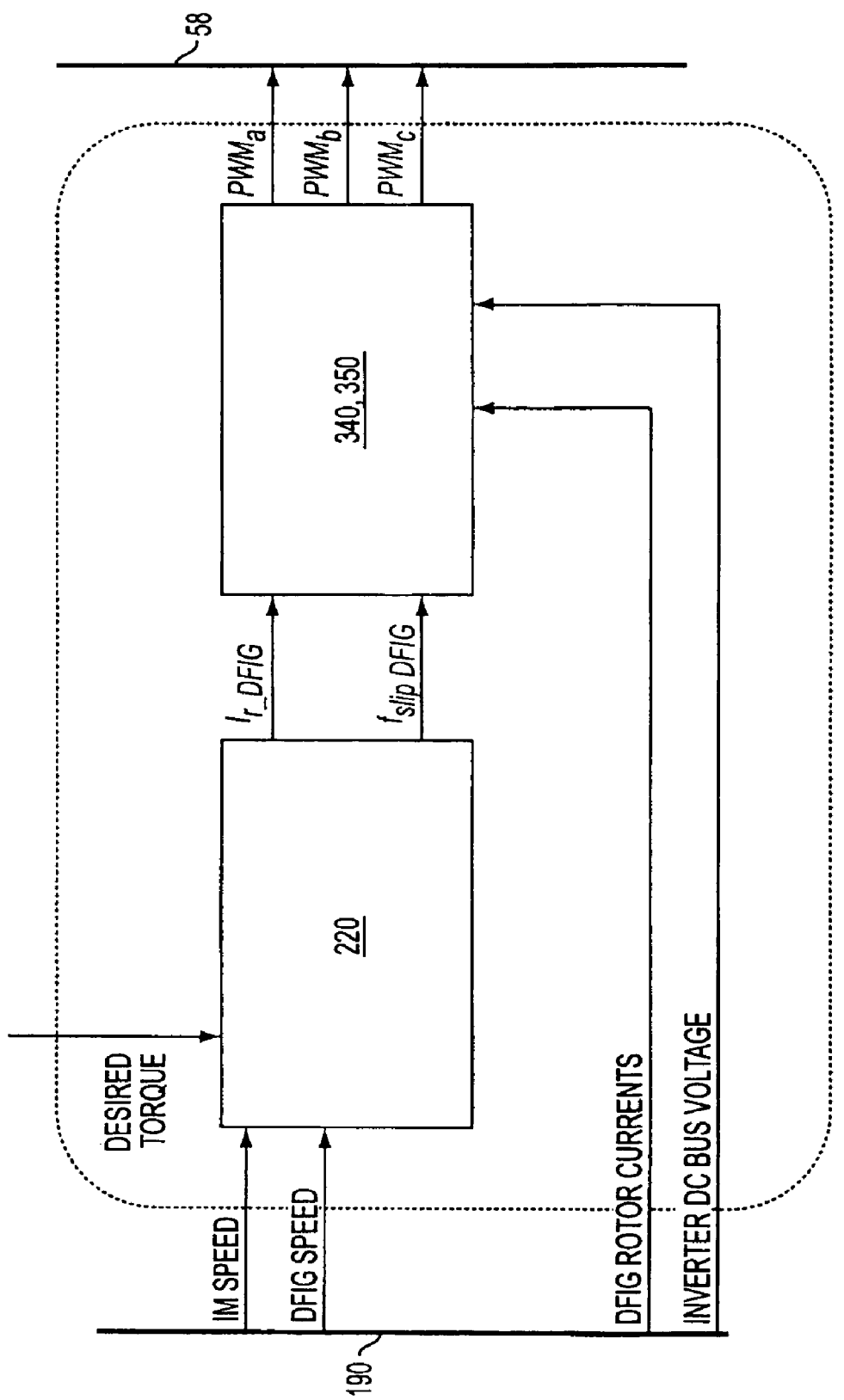
FIG. 16 is a flowchart disclosing the flow of input and output signals to and from the induction motor torque main process and the proportional and integration current controller sub-process.

As stated earlier, in embodiments 102, 103, and 104, the high side switches 75, 77, and 79 and the inverter's 58 switches are gated on and off using pulse width modulation. Control signals 91–96 output from controller 26 gate the power-on time of the switching devices in inverter 58 and high side switches 75, 77 and 79 so that each device outputs a pulse width modulated electric current to each phase of the rotor winding 56. FIGS. 14–16 are flowcharts which disclose the steps executed in controller 26 to determine how to gate the power-on time of the switching devices in inverter 58 and high side switches 75, 77 and 79. These steps can be stored in software 107 located in memory 111 in controller 26.

Figure 17:
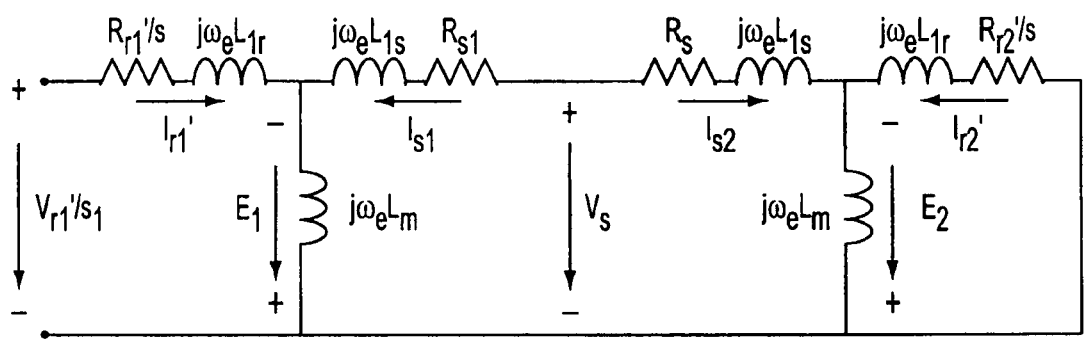
FIG. 17 is a mathematical model of the joint DFIG 24 and IM 28 system to calculate the desired DFIG rotor 54 current.
Figure 18A:
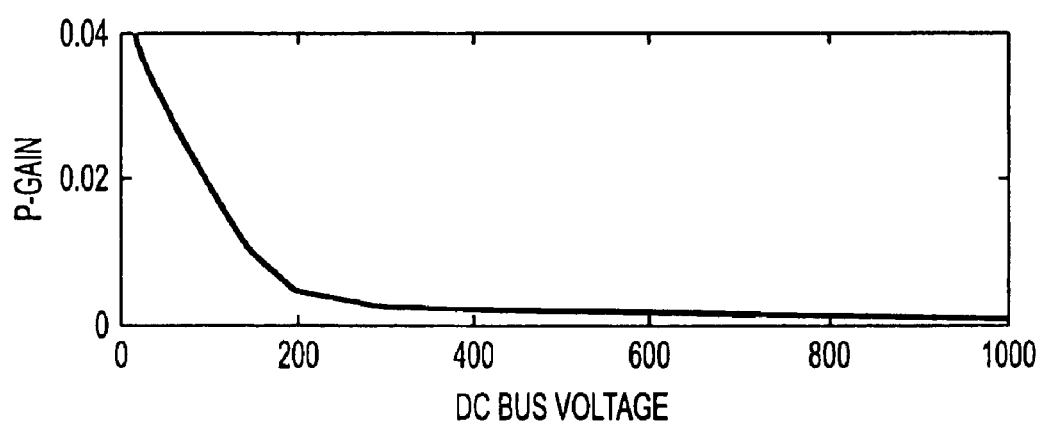
FIG. 18a is a graph of the gain scheduling of the proportional gain versus DC bus voltage.
Figure 18B:
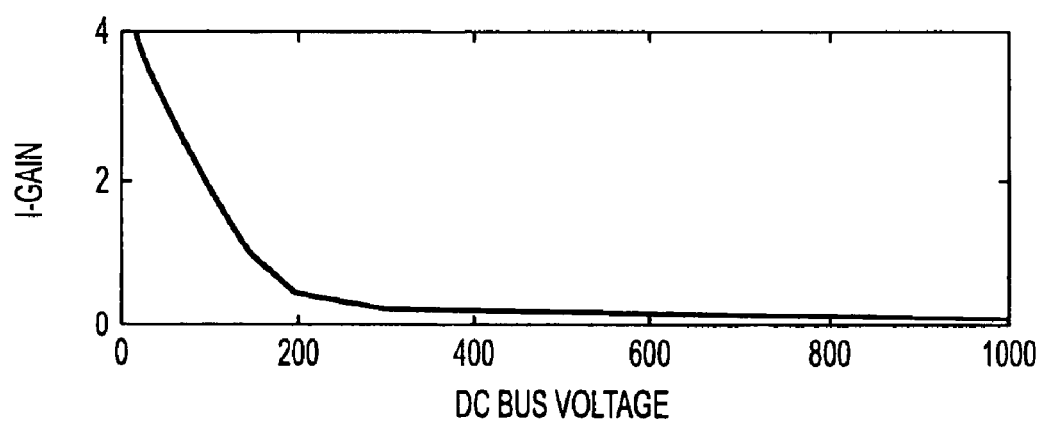
FIG. 18b is a graph of the gain scheduling of the integration gain versus DC bus voltage.

FIG. 14 discloses the steps taken in the induction motor 28 (IM) torque control main process. The steps are as follows. Start (Step 200). Read the following sensor 190 inputs IM 28 speed, DFIG 54 speed and desired torque (Step 210). Use a mathematical model, or equivalent circuit model, of the joint DFIG 24 and IM 28 system to calculate the desired DFIG rotor 54 current (both amplitude and frequency, $I_{r\ DFIG}$ and $f_{slip\ DFIG}$) (Step 220). An equivalent circuit model is shown in FIG. 17. Output the desired DFIG rotor 24 current $I_{r\ DFIG}$, $f_{slip\ DFIG}$ to the proportional and integration (PI) current controller 26 method (Step 230). End (Step 240).

FIG. 15 discloses steps taken in the proportional and integration (PI) current controller 26 process. The steps are as follows. Start (Step 300). Read the following inputs: desired DFIG rotor 54 current, both amplitude $I_{r\ DFIG}$ and frequency $f_{slip\ DFIG}$, inverter 58 DC bus voltage, and three-phase DFIG rotor 54 currents (Step 310). Calculate the desired instantaneous three-phase DFIG rotor 24 currents (Step 320). The individual DFIG rotor phase currents are calculated using the following formulas:

$i_a = I_{rotor\ DFIG} * \sin(2\Pi f_{slip\ DFIG} * t)$, where $i_a$ is the phase a current $i_b = I_{rotor\ DFIG} * \sin(2\Pi f_{slip\ DFIG} * t - 2/3\Pi)$, where $i_b$ is the phase b current $i_c = I_{rotor\ DFIG} * \sin(2\Pi f_{slip\ DFIG} * t + 2/3\Pi)$, where $i_c$ is the phase c current.

Calculate the proper PI gain given the current DC Bus voltage value (Step 325). In a preferred embodiment, values for the proportional gain, P-gain, and the integration gain, I-gain, for a given DC bus voltage value are derived from the tables illustrated in FIGS. 18a and 18b respectfully. Compare the desired phase currents with actual phase currents and produce a phase current error (Step 330). In a preferred embodiment, this comparison is made by subtracting one value from another value. Next, the PI controller 26 processes the phase current error using the proportional gain, P-gain, and the integration gain, I-gain and calculates 3-phase PWM duty cycles for the inverter (Step 340). Output PWM duty cycles PWMa, PWMb, and PWMc (Step 350). End (Step 360). FIG. 16 is a flowchart disclosing the flow of input and output signals to and from the IM 24 torque main method and the PI current controller 26 method.

While the invention has been disclosed in this patent application by reference to the details of preferred embodiments of the invention, it is to be understood that the disclosure is intended in an illustrative rather than in a limiting sense, as it is contemplated that modification will readily occur to those skilled in the art, within the spirit of the invention and the scope of the appended claims and their equivalents.

What is claimed is:

1. A power drive electronics apparatus operably connected between a frequency variable generator and an electric motor, comprising: a three-phase diode rectifier having a three-phase AC input, a positive DC output terminal and a negative DC output terminal, said three-phase AC input operably connected to said electric motor and said positive DC output terminal operably connected to said frequency variable generator's rotor windings; a diode having an anode and a cathode, said cathode operably connected to said positive DC output terminal of said three-phase diode rectifier; a battery operably connected to said anode of said diode; and a capacitor operably connected between said positive DC output terminal and said negative DC output terminal of said three-phase diode rectifier.

2. The power drive electronics apparatus according to claim 1 further comprising a switch having a first terminal and a second terminal, wherein said first terminal of said switch is operably connected to said battery and a second terminal of said switch is operably connected to said anode of said diode.

3. The power drive electronics apparatus according to claim 2 wherein said power electronics apparatus further comprises: at least one high side switch having a first terminal operably connected to said positive DC output terminal of said three-phase diode rectifier, a second terminal operably connected to said frequency variable generators rotor winding, and a control terminal; and a controller operably connected to said control terminal of said at least one high side switch.

4. The power drive electronics apparatus according to claim 2 wherein said power electronics apparatus further comprises: an inverter having a three-phase ac output, a positive DC input terminal and a negative DC input terminal, wherein said positive DC input terminal is operably connected to said positive DC output terminal of said three-phase diode rectifier, said negative DC input terminal is operably connected to said negative DC output terminal of said three-phase diode rectifier, and said three-phase ac output is operably connected to said frequency variable generator's rotor winding; and a controller operably connected to said inverter.

5. The power drive electronics apparatus according to claim 4 wherein said inverter includes three phase legs operably connected in parallel, each phase leg includes two switches operably connected in series; and said controller includes a microprocessor, memory operably connected to said microprocessor, and software stored in said memory, said software includes instructions to turn said switches of said inverter on and off, whereby said inverter outputs a pulse width modulated electric current, said instructions include the following steps: reading motor speed, generator speed and desired torque; calculating a desired generator rotor current; reading said desired generator rotor current, a DC bus voltage, and a three-phase generator rotor current; calculating a desired instantaneous generator three-phase rotor current; calculating a proportional and integration gain; comparing said desired instantaneous three-phase generator rotor current with said three-phase generator rotor current; producing a phase current error; processing said phase current error; calculating three-phase pulse width modulation duty cycles; and outputting said three-phase pulse width modulation duty cycles.

6. The power drive electronics apparatus according to claim 4 further comprising an energy absorber operably connected between said positive DC output terminal and said negative DC output terminal of said three-phase diode rectifier.

7. The power drive electronics apparatus according to claim 4 wherein said frequency variable generator is a double-fed induction generator and said electric motor is an induction motor.

8. A method of controlling a power drive electronics apparatus operably connected between a frequency variable generator and an electric motor, said power drive electronics apparatus comprising: a three-phase diode rectifier having a three-phase AC input, a positive DC output terminal and a negative DC output terminal, said three-phase AC input operably connected to said electric motor and said positive DC output terminal operably connected to said frequency variable generator's rotor windings; a diode having an anode ends cathode, said cathode operably connected to said positive DC output terminal of said three-phase diode rectifier; a battery operably connected to said anode of said diode; and a capacitor operably connected between said positive DC output terminal and said negative DC output terminal of said three-phase diode rectifier, the method comprising:
applying system power to the rotor windings of the generator;
disconnecting said system power; rectifying ac power from a motor;
pulse width modulating said rectified ac power; and
applying said pulse width modulated rectified ac power to the rotor winding of the generator.

9. The method according to claim 8 further comprising the steps of: pulse width modulating said rectified ac power, and applying said pulse width modulated rectified ac power to the rotor winding of the generator.

10. The method according to claim 9 further comprising the step of absorbing energy from said motor during deceleration.

11. The method according to claim 9 wherein said step of pulse width modulating said rectified ac power comprises: reading motor speed, generator speed and desired torque; calculating a desired generator rotor current; reading said desired generator rotor current, a DC bus voltage, and a three-phase generator rotor current; calculating a desired instantaneous generator tree-phase rotor current; calculating a proportional and integration gain; comparing said desired instantaneous three-phase generator rotor current with said three-phase generator rotor current; producing a phase current error; processing said phase current error; calculating three-phase pulse width modulation duty cycles; and outputting said three-phase pulse width modulation duty cycles.

12. The method according to claim 11 further comprising the step of absorbing energy from said motor during deceleration.

* * * * *

UNITED STATES PATENT AND TRADEMARK OFFICE
CERTIFICATE OF CORRECTION

PATENT NO.       : 7,081,725 B2
APPLICATION NO.  : 10/772399
DATED            : July 25, 2006
INVENTOR(S)      : Stanley L. Seely et al.

It is certified that error appears in the above-identified patent and that said Letters Patent is hereby corrected as shown below:

On the Title Page, Item (75) Inventors, "Stanley S. Seely" should be --Stanley L. Seely--.

On the Title Page, Item (56) References Cited, U.S. Patent Documents, "6,419,040 B1" should be --6,419,040 B2--.

Column 4, line 38, "(AWL)" should be --(AWD)--.

Column 7, line 7, "ffDFGex" should be -- ffDFIGex--.

Signed and Sealed this

Seventeenth Day of July, 2007

JON W. DUDAS
*Director of the United States Patent and Trademark Office*

UNITED STATES PATENT AND TRADEMARK OFFICE
CERTIFICATE OF CORRECTION

PATENT NO.         : 7,081,725 B2
APPLICATION NO. : 10/772399
DATED                 : July 25, 2006
INVENTOR(S)       : Stanley L. Seely et al.

It is certified that error appears in the above-identified patent and that said Letters Patent is hereby corrected as shown below:

On the Title Page, Item (75) Inventors, "Stanley S. Seely" should be --Stanley L. Seely--.

On the Title Page, Item (56) References Cited, U.S. Patent Documents, "6,419,040 B1" should be --6,419,040 B2--.

Column 4, line 38, "(AWL)" should be --(AWD)--.

Column 7, line 7, "ffDFGex" should be -- ffDFIGex--.

Column 12, line 31, Claim 3, "generators" should be --generator's--.

Column 13, line 19, Claim 8, "ends" should be --and a--.

Column 14, line 17, Claim 11, "tree-phase" should be --three-phase--.

This certificate supersedes the Certificate of Correction issued July 17, 2007.

Signed and Sealed this

Seventeenth Day of June, 2008

JON W. DUDAS
*Director of the United States Patent and Trademark Office*